(12) United States Patent
She et al.

(10) Patent No.: US 6,680,807 B1
(45) Date of Patent: Jan. 20, 2004

(54) SERVO MARK DETECTION FOR A DISK DRIVE SYSTEM

(75) Inventors: Sian She, Broomfield, CO (US); David E. Reed, Westminster, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/521,284

(22) Filed: Mar. 8, 2000

(51) Int. Cl.$^7$ .................................................. G11B 5/09
(52) U.S. Cl. ...................................... 360/51; 360/77.08
(58) Field of Search ............................. 360/51, 46, 31, 360/65, 77.08

(56) References Cited

U.S. PATENT DOCUMENTS

| | | | |
|---|---|---|---|
| 5,576,906 A | * | 11/1996 | Fisher et al. ................... 360/46 |
| 5,726,818 A | | 3/1998 | Reed et al. |
| 5,737,142 A | | 4/1998 | Zook |
| 5,786,950 A | | 7/1998 | Zook et al. |
| 5,926,490 A | | 7/1999 | Reed et al. |
| 6,031,672 A | * | 2/2000 | Bergquist et al. .............. 360/46 |

OTHER PUBLICATIONS

Siegel, Paul H., "Modulation and Coding for Information Storage," IEEE Communications Magazine, IEEE, p. 68–86, (Dec. 2, 1991).
U.S. patent application Ser. No. 09/338,020, filed Jun. 22, 1999, 0958–MS.
U.S. patent application Ser. No. 09/338,019, Jun. 22, 1999, 0959–MS.

* cited by examiner

*Primary Examiner*—David Hudspeth
*Assistant Examiner*—Varsha A. Kapadia
(74) *Attorney, Agent, or Firm*—Duft Setter Ollila & Bornsen LLC

(57) ABSTRACT

A disk drive system is disclosed that includes a disk device coupled to control circuitry. The control circuitry includes a read channel with a detector that detects servo mark sub-patterns and correlates the detected servo mark sub-patterns to detect a servo mark. The detector includes matched filters to detect the sub-patterns.

50 Claims, 7 Drawing Sheets

SERVO MARK DETECTION FOR A DISK DRIVE SYSTEM

BACKGROUND OF THE INVENTION

1. Field of the Invention

The invention is related to the field of disk drive systems, and in particular to disk drive systems and circuitry that detect and correlate servo mark sub-patterns to detect servo marks.

2. Statement of the Problem

A disk drive system stores user data in tracks on its disks. The user data in the tracks is interspersed with servo marks and servo data. The disk drive system uses the servo marks to locate both the servo data and selected portions of the user data. Because servo marks are used to locate the other data, servo mark detection is critical to proper system operation.

A servo mark is a bit sequence that is encoded at regular intervals in the tracks on the disks. To detect a servo mark, a head is positioned over a few of the tracks and senses the data encoded on the disk to generate a read signal. The disk drive system converts the read signal into a sequence of samples. The samples are passed through Viterbi circuitry to detect the servo marks.

The Viterbi circuitry assigns probabilities to possible bit sequences and selects the most likely sequence for a match with the servo mark. The Viterbi circuitry typically operates well when the servo marks are aligned from one track to the next. Unfortunately, the Viterbi circuitry may fail during a transition between tracks if the servo marks in the respective tracks are not aligned. The mis-alignment causes a phase shift that the Viterbi circuitry cannot effectively handle. The failure to detect servo marks interrupts system operation and inhibits the transfer of user data.

SUMMARY OF THE SOLUTION

The invention solves the above problem by using servo mark sub-pattern detection and correlation to detect servo marks. The sub-pattern detection and correlation accurately detects mis-aligned servo marks when the system transitions from one track to another. System operation is improved because servo mark detection failure is reduced resulting in fewer interruptions during user data transfer.

The invention includes disk drive systems, circuitry, and methods of operation. The disk drive system includes a disk device coupled to control circuitry. The control circuitry includes a read channel with a detector that detects servo mark sub-patterns and correlates the detected servo mark sub-patterns to detect a servo mark. The detector includes matched filters to detect the sub-patterns.

A particular reference number represents the same element on all figures.

DETAILED DESCRIPTION

Figure 1:
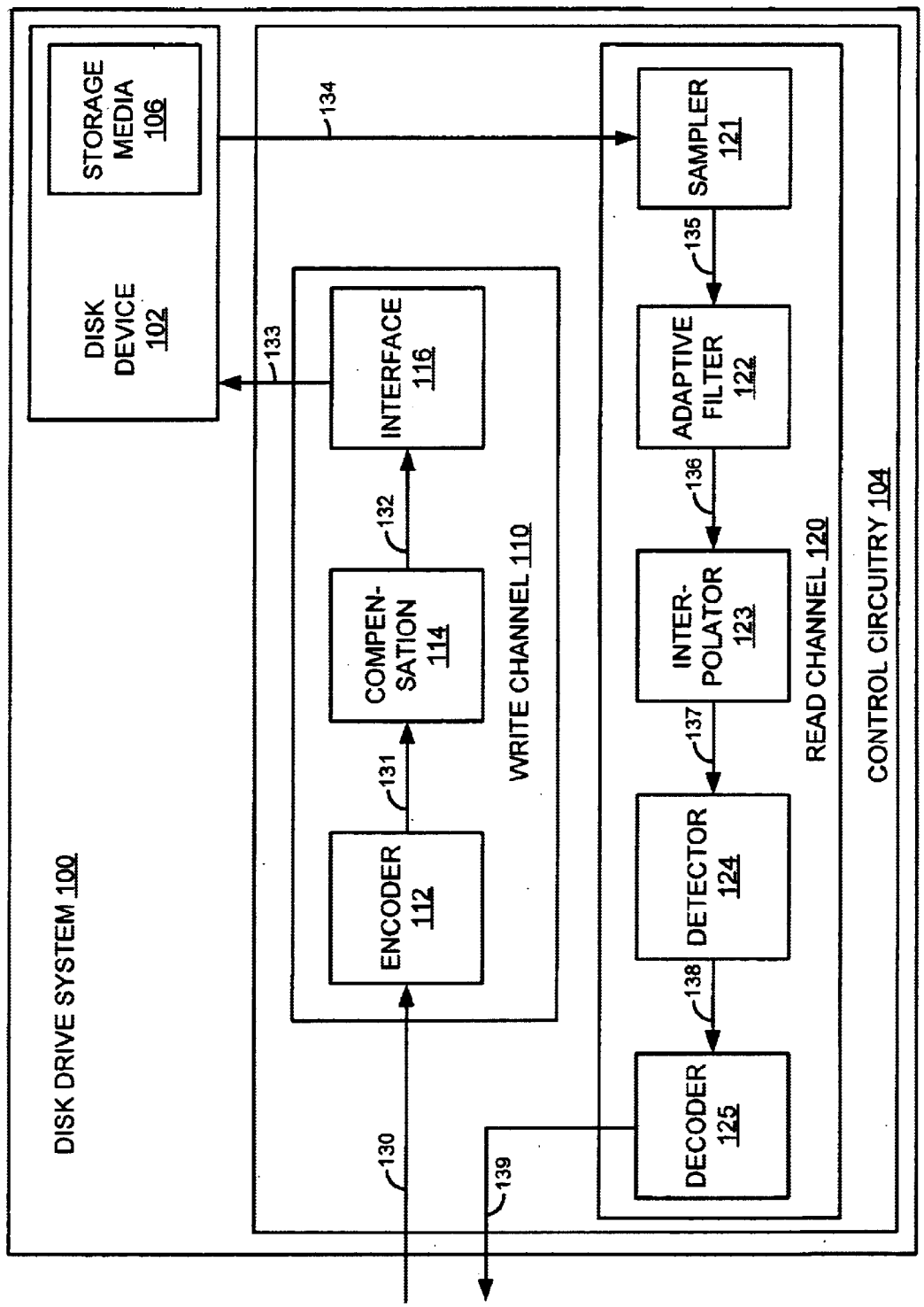
FIG. 1 is a block diagram that illustrates a disk drive system in the prior art.
Figure 2:
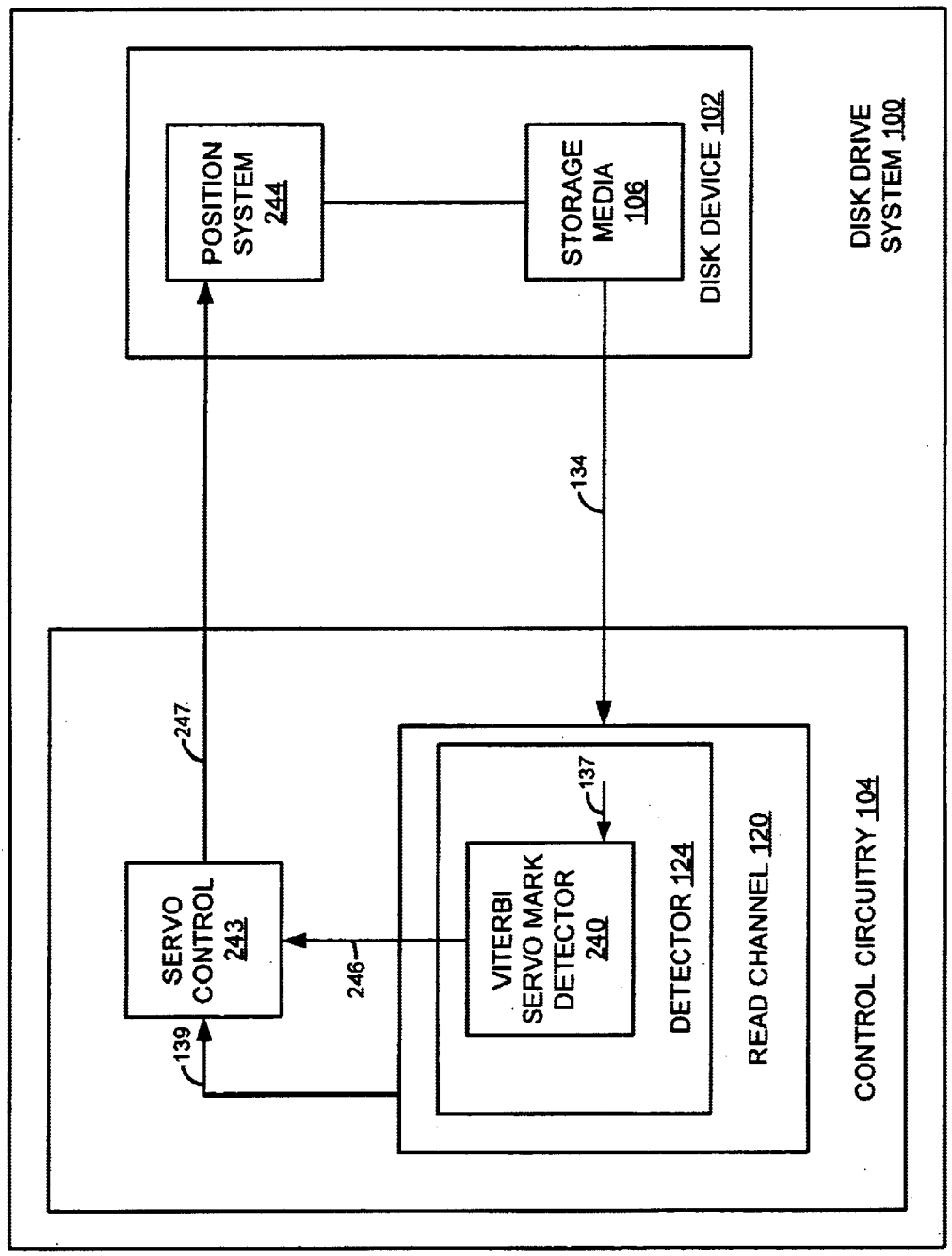
FIG. 2 is a block diagram that illustrates a servo system in the prior art.
Figure 3:
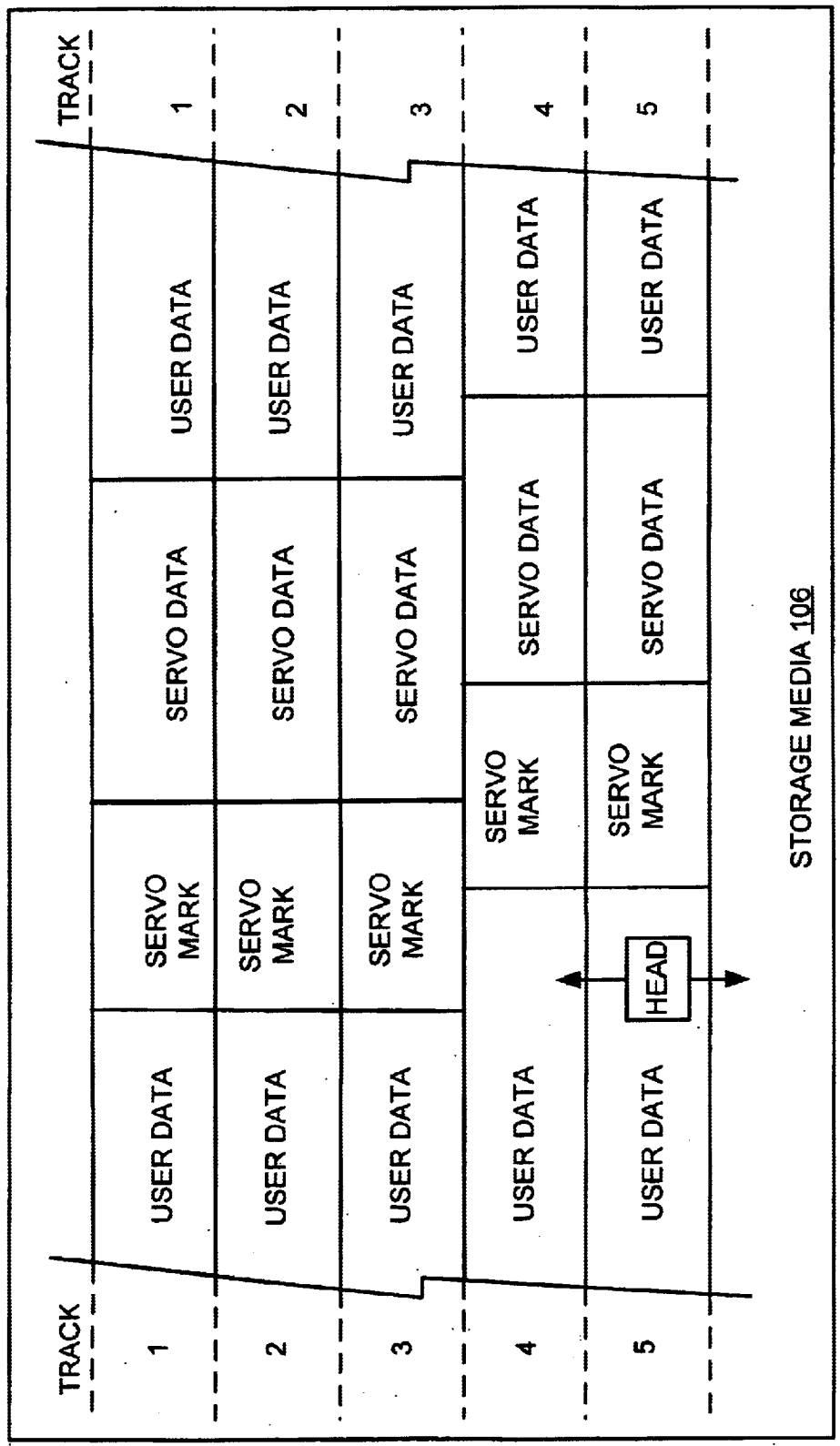
FIG. 3 is a block diagram that illustrates servo marks in the prior art.

Prior Art Disk Drive System—FIGS. 1–3

FIG. 1 shows an example of the user data path for a disk drive system 100 in the prior art. Disk drive system 100 includes a disk device 102 and associated control circuitry 104. Disk device 102 includes storage media 106. Some examples of storage media 106 include magnetic disks and optical disks. Control circuitry 104 includes write channel 110 and read channel 120. Write channel 110 includes encoder 112, compensation 114, and write interface 116 connected in series. Read channel 120 includes sampler 121, adaptive filter 122, interpolator 123, detector 124, and decoder 125 connected in series. Interface 116 and sampler 121 are coupled to disk device 102.

Write channel 110 receives data signal 130 and transfers a corresponding write signal 133 to disk device 102. Disk device 102 stores the user data on storage media 106. Subsequently, disk device 102 reads storage media 106 and transfers a corresponding read signal 134 to read channel 120. Write signal 133 and read signal 134 should both represent the same user data. Read channel 120 processes read signal 134 to generate data signal 139. Ideally, data signal 139 carries the same data as data signal 130.

Write channel 110 operates as follows. Encoder 112 receives and encodes data signal 130 to generate encoded signal 131. The encoding provides error-checking capability when the data is subsequently decoded. Encoder 112 transfers encoded signal 131 to compensation 114. Compensation 114 adjusts the timing of transitions in encoded signal 131 to generate time-adjusted signal 132. Compensation 114 transfers time-adjusted signal 132 to interface 116. Interface 116 converts time-adjusted signal 143 from digital to analog to generate write signal 133. Interface 116 transfers write signal 133 to disk device 102.

If storage media 106 is a magnetic disk, then write signal 133 drives a magnetic head that alters a magnetic field to create magnetic transitions on the magnetic disk. These magnetic transitions should represent the user data. The magnetic head subsequently detects the magnetic transitions to generate read signal 134. If storage media 106 is an optical disk, then write signal 133 drives a system that creates pits in the surface of the optical disk. The pits are physical transitions that represent the user data. An optical head subsequently projects a laser onto the surface of the disk. The optical head detects the reflection of the laser, which is altered by the pits, to generate read signal 134.

The accurate positioning of heads relative to disks is essential for proper system operation. To provide for accurate positioning, servo information is also stored on the disk, and read signal 134 includes this servo information. The control circuitry 104 processes the servo information from read signal 134 to control the location of the heads relative to the disks.

Read channel 120 operates as follows. Sampler 121 receives and samples read signal 134 to generate read samples 135. Sampler 121 transfers read samples 134 to adaptive filter 122. Adaptive filter 122 removes distortion by shaping read samples 135 to generate equalized samples 136. Adaptive filter 122 transfers equalized samples 136 to interpolator 123. Interpolator 123 synchronizes equalized samples 136 with the clock for detector 124 to generate interpolated samples 137. Interpolator 123 transfers interpolated samples 137 to detector 124. Detector 124 uses a detection algorithm, such as a Viterbi state machine, to convert interpolated samples 137 into encoded signal 138 that represents the user data. Detector 124 transfers encoded signal 138 to decoder 125. Decoder 125 decodes encoded signal 138 into data signal 139 by applying a decoding technique, such as PR4 with D=1 constraints. Decoder 125 also performs error-checking functions.

FIG. 2 illustrates the servo system of disk drive system 100. The disk drive system 100 includes disk device 102 and control circuitry 104. Disk device 102 includes storage media 106 and position system 244. Control circuitry 104 includes read channel 120 and servo control 243. Read channel 120 includes detector 124, which includes Viterbi servo mark detector 240.

In operation, disk device 102 transfers read signal 134 from storage media 106 to read channel 120 in control circuitry 104. Read channel 120 processes read signal 134 as described above and transfers data signal 139 to servo control 243. In addition, detector 124 transfers interpolated samples 137 to Viterbi servo mark detector 240. Viterbi servo mark detector 240 processes interpolated samples 137 with a one-half clock PR4 Viterbi algorithm to detect the servo mark. The Viterbi algorithm sums consecutive samples and assigns probabilities to several possible bit sequences derived from the samples. The Viterbi algorithm then compares the most likely bit sequence to a 9-bit pattern representing the servo mark. If a match is found, Viterbi servo mark detector 240 indicates servo mark detection in servo mark detection signal 246 that it transfers to servo control 243.

In response to servo mark detection, servo control 243 recovers servo data from data signal 139. Servo control 243 processes the servo data to generate position signal 247 that will position disk device. 102 at the target position. Servo control 243 transfers position signal 247 to position system 244 in disk device 102. Position system 244 positions storage media 106 to the target position in response to position signal 247. Typically, positioning entails moving a selected head over a desired track and waiting for a precise time to elapse after servo mark detection in the desired track.

FIG. 3 illustrates a portion of some of the tracks on storage media 106. Each track includes a servo mark and servo data inserted between user data. Servo control 243 uses the servo marks locate the servo data and selected portions of the user data. Servo control 243 and position system 244 perform two basic positioning operations—seek and follow. In a seek operation, servo control 243 uses track numbers from the servo data to position the head over the desired track. In a follow operation, servo control 243 uses burst signals from the servo data to center the head over the desired track. Servo control 243 must receive accurate servo mark detection to effectively process the servo data and position disk device 102.

Servo mark detection after a seek operation can be a problem. On a seek from track three to track one, the re-acquisition of the servo mark is eased because the servo marks are aligned so there is no phase shift. Thus, Viterbi servo mark detector 240 knows when to expect the servo mark in track one. The problem occurs after a seek from track four to track one because the respective servo marks are not aligned and Viterbi servo mark detector 240 must handle a phase shift between the servo marks. Thus, Viterbi servo mark detector 240 expects the servo mark in track one at the wrong time. Unfortunately, the Viterbi algorithm often fails to detect a servo mark in the presence of a phase shift. The failure to detect the servo mark interrupts normal system operation.

Figure 4:
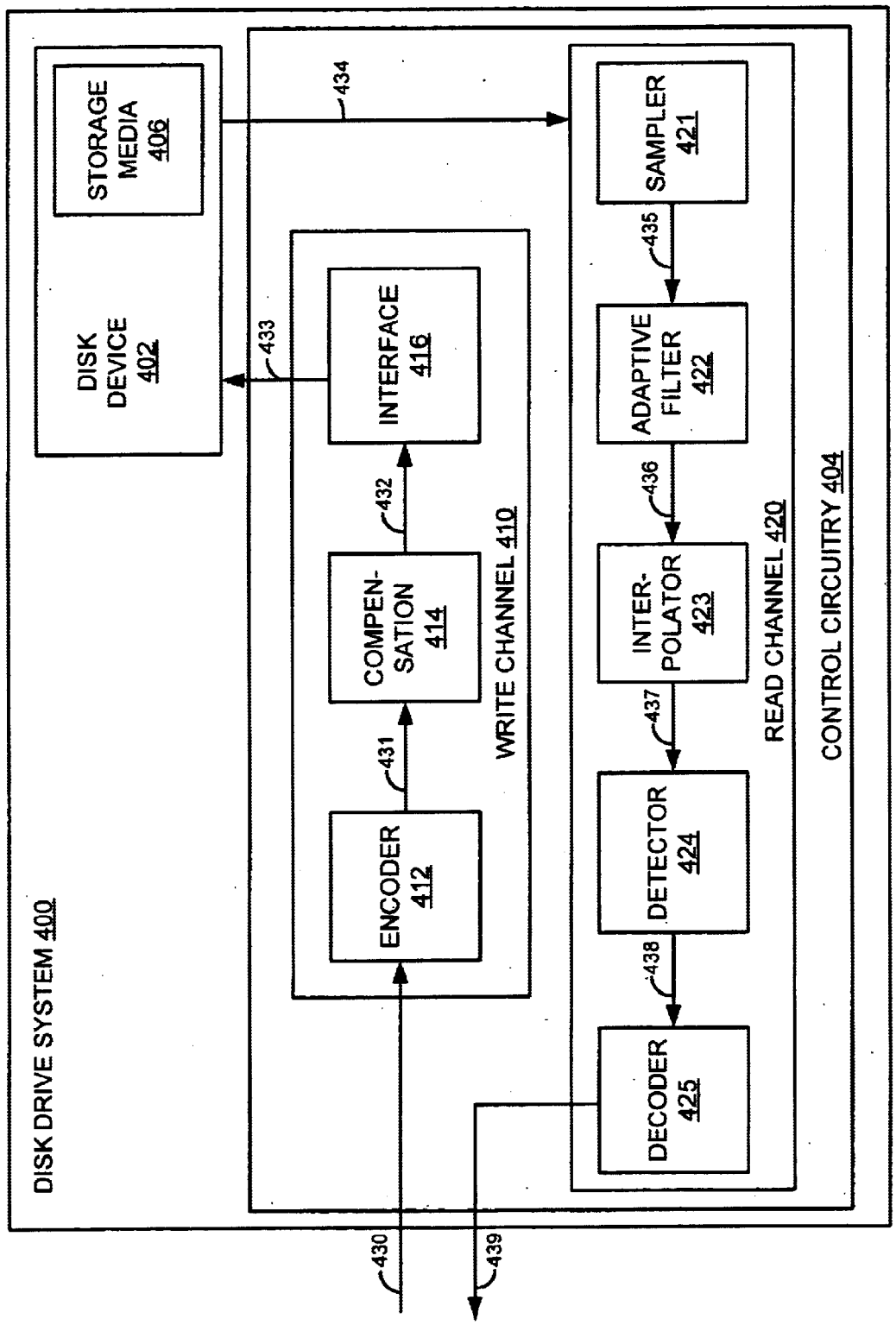
FIG. 4 is a block diagram that illustrates a disk drive system in an example of the invention.
Figure 5:
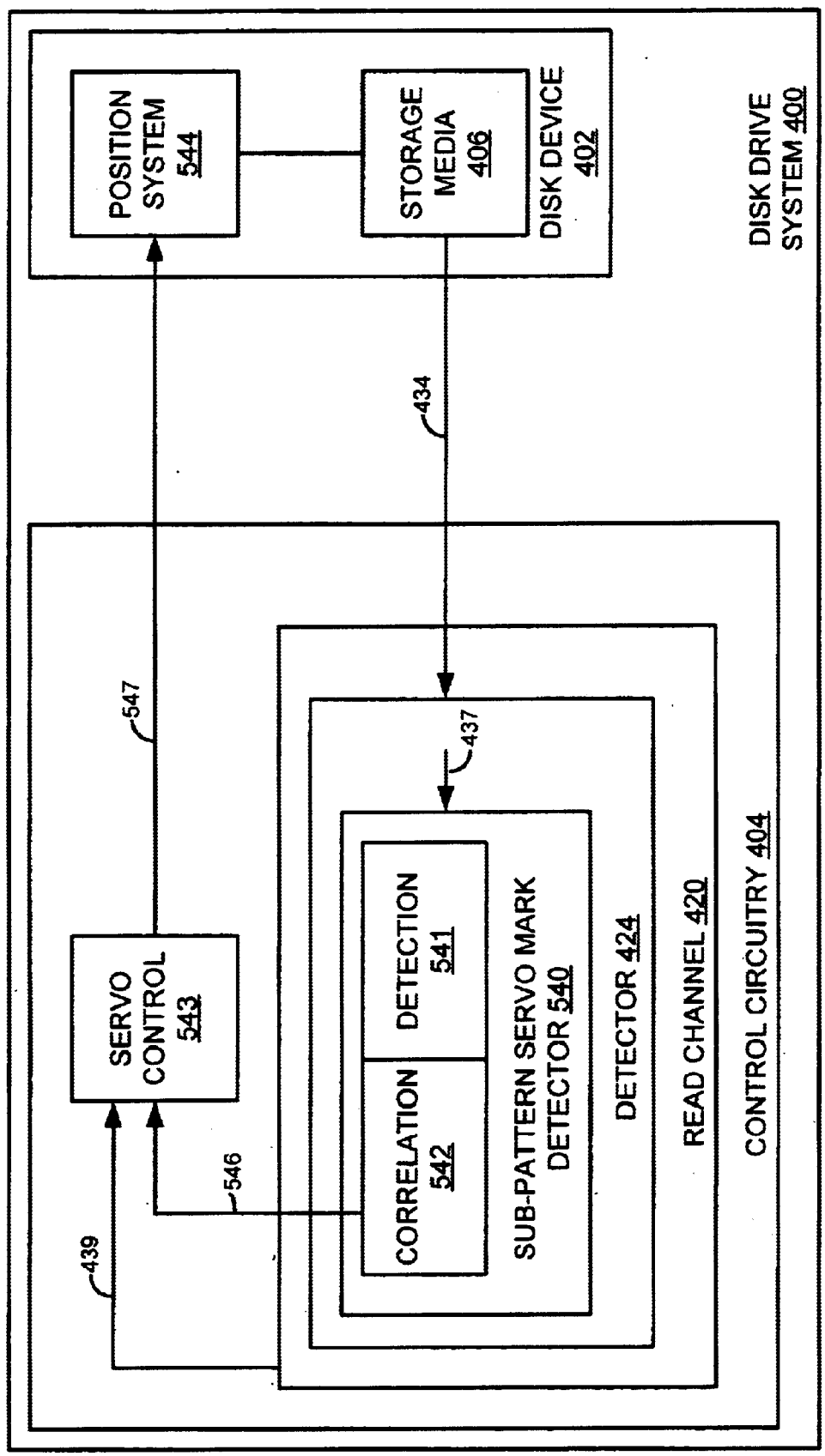
FIG. 5 is a block diagram that illustrates a servo system in an example of the invention.

Disk Drive System Configuration and Operation—
FIGS. 4–5.

FIGS. 4–5 depict an example of a disk drive system in an embodiment of the invention. Those skilled in the art will appreciate numerous variations from this example that do not depart from the scope of the invention. Those skilled in the art will also appreciate that various features could be combined to form multiple variations of the invention.

FIG. 4 illustrates the user data path for disk drive system 400. Disk drive system 400 includes disk device 402 and associated control circuitry 404. Disk device 402 includes storage media 406. Some examples of storage media 406 include magnetic disks and optical disks. Control circuitry 404 includes write channel 410 and read channel 420. Write channel 410 includes encoder 412, compensation 414, and write interface 416 connected in series. Read channel 420 includes sampler 421, adaptive filter 422, interpolator 423, detector 424, and decoder 425 connected in series. Interface 416 and sampler 421 are coupled to disk device 402.

Write channel 410 receives data signal 430 and transfers a corresponding write signal 433 to disk device 402. Disk device 402 stores the user data on storage media 406. Subsequently, disk device 402 reads storage media 406 and transfers a corresponding read signal 434 to read channel 420. Write signal 433 and read signal 434 should both represent the same user data. Read channel 420 processes read signal 434 to generate data signal 439. Ideally, data signal 439 carries the same user data as data signal 430.

Write channel 410 operates as follows. Encoder 412 receives and encodes data signal 430 to generate encoded signal 431. The encoding provides error-checking capability when the data is subsequently decoded. Encoder 412 transfers encoded signal 431 to compensation 414. Compensation 414 adjusts the timing of transitions in encoded signal 431 to generate time-adjusted signal 432. Compensation 414 transfers time-adjusted signal 432 to interface 416. Interface 416 converts time-adjusted signal 443 from digital to analog to generate write signal 433. Interface 416 transfers write signal 433 to disk device 402.

Read channel 420 operates as follows. Sampler 421 receives and samples read signal 434 to generate read samples 435. Sampler 421 transfers read samples 434 to adaptive filter 422. Adaptive filter 422 removes distortion by shaping read samples 435 to generate equalized samples 436. Adaptive filter 422 transfers equalized samples 436 to interpolator 423. Interpolator 423 synchronizes equalized samples 436 with the clock for detector 424 to generate interpolated samples 437. Interpolator 423 transfers interpolated samples 437 to detector 424. Detector 424 uses a detection algorithm, such as a Viterbi state machine, to convert interpolated samples 437 into an encoded signal 438 that represents the user data. Detector 424 transfers encoded signal 438 to decoder 425. Decoder 425 decodes encoded signal 438 into data signal 439 by applying a decoding technique, such as PR4 with D=1 constraints. Decoder 425 also performs error-checking functions.

FIG. 5 illustrates the servo system of disk drive system 400. The disk drive system 400 includes disk device 402 and control circuitry 404. Disk device 402 includes storage media 406 and position system 544. Control circuitry 404 includes read channel 420 and servo control 543. Read channel 420 includes detector 424, which includes servo mark detector 540. Servo mark detector 540 includes sub-pattern detection 541 and sub-pattern correlation 542. Aside from the servo mark detector 540, the other components on FIGS. 4–5 could be conventional.

Servo mark detector 540 could be integrated with Gray code detection circuitry. An example of such Gray code detection circuitry is disclosed in patent application entitled "GRAY CODE DETECTION FOR A DISK DRIVE SYSTEM", which was filed on the same day as this application, which has the same inventors and assignee as this application, and which is incorporated by reference into this application.

In operation, disk device 402 transfers read signal 434 from storage media 406 to read channel 420 in control circuitry 404. Read channel 420 processes read signal 434 as described above and transfers data signal 439 to servo control 543. In addition, detector 424 transfers interpolated samples 437 to detection 541. Detection 541 detects various sub-patterns in the servo mark bit sequence and indicates detection of the various sub-patterns to correlation 542. Correlation 542 then correlates the various detected sub-patterns to detect the servo mark. Correlation 542 indicates servo mark detection in servo mark detection signal 546 that it transfers to servo control 543.

In response to servo mark detection, servo control 543 recovers the servo data from data signal 439. Servo control 543 processes the servo data to generate position signal 547 that will position disk device 402 to the target position. Servo control 543 transfers position signal 547 to position system 544 in disk device 102. Position system 544 positions storage media 406 to the target position in response to position signal 547. Typically, positioning entails moving a selected head over a desired track and waiting for a precise time to elapse after servo mark detection.

Figure 6:
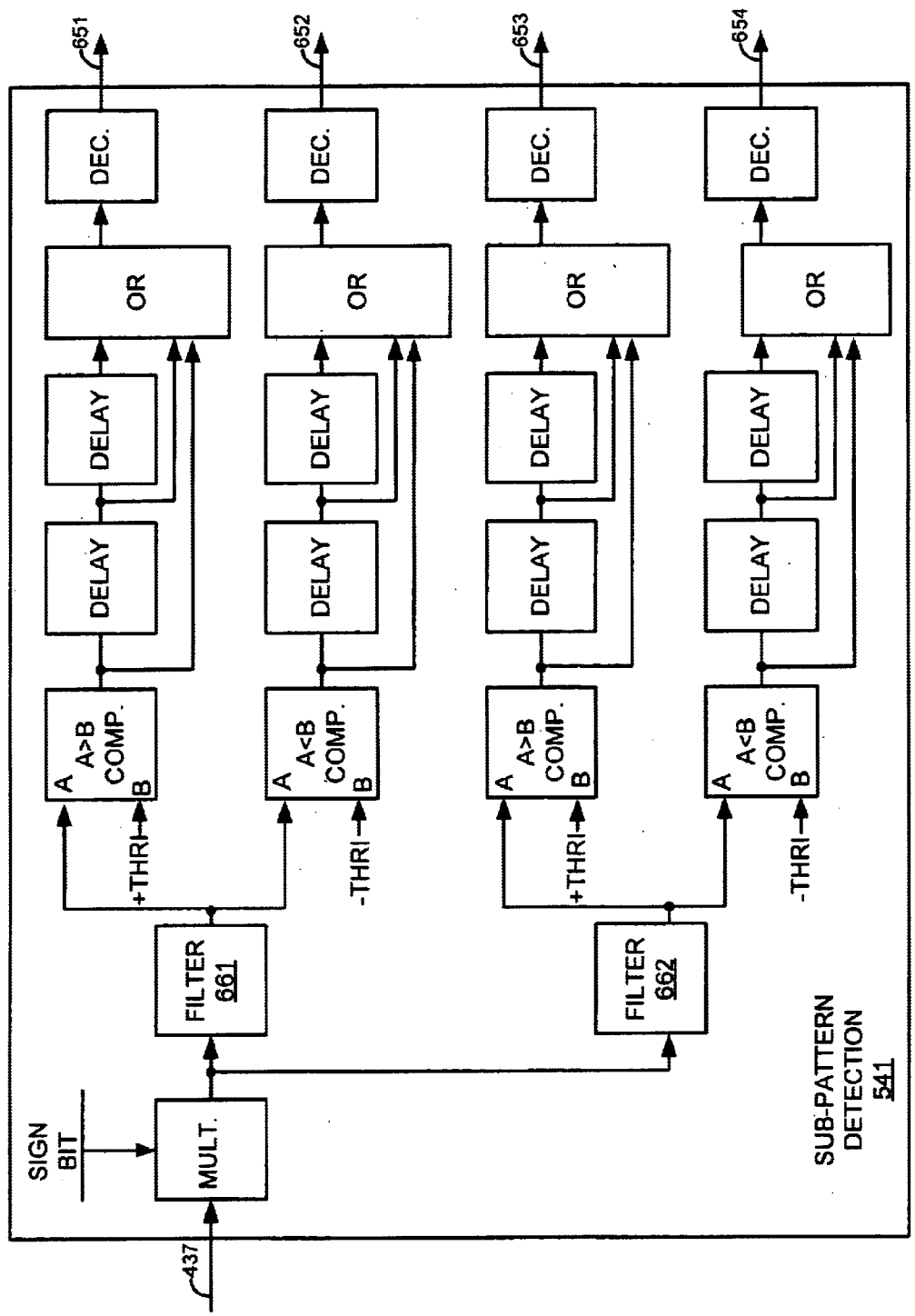
FIG. 6 is a block diagram that illustrates a servo mark sub-pattern detector in an example of the invention.
Figure 7:
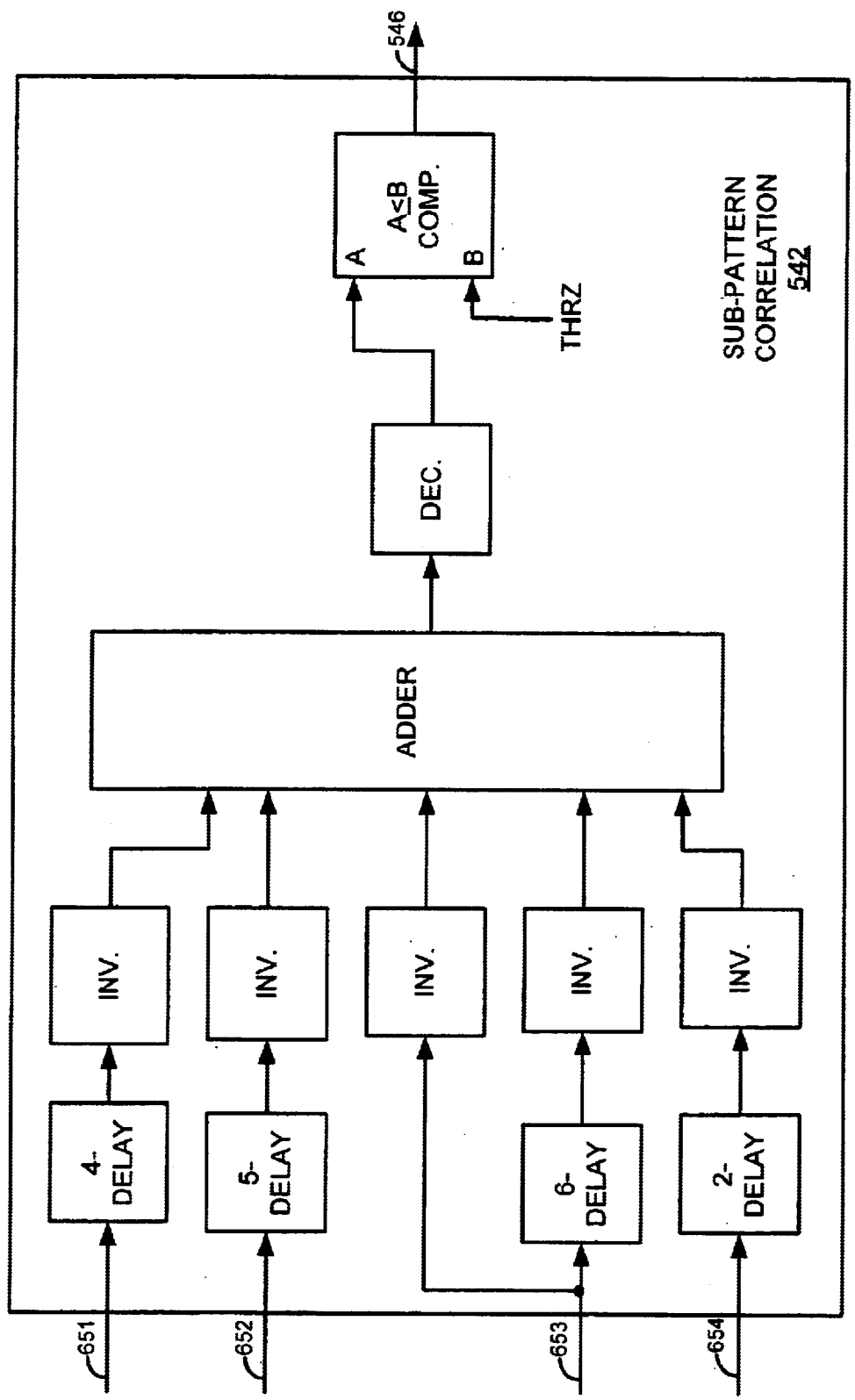
FIG. 7 is a block diagram that illustrates a servo mark sub-pattern correlator in an example of the invention.

Servo Mark Detector—FIGS. 6–7

FIGS. 6–7 depict an example of a servo mark detector in an embodiment of the invention. Those skilled in the art will appreciate numerous variations from this example that do not depart from the scope of the invention. Those skilled in the art will also appreciate that various features could be combined to form multiple variations of the invention. This example uses a standard 16-bit servo mark, although based on this disclosure, those skilled in the art will appreciate how to practice the invention with servo marks of various bit lengths. The standard 16-bit servo mark is depicted in the following table:

Although the actual filter inputs are in increments of $\frac{1}{16}$ from $(-32/16)$ to $(+31/16)$, the following discussion of filters 661 and 662 assumes that filter inputs are discreet integer values of $-1$, $0$, or $+1$ for the sake of simplicity. Filter 661 output is $+4$ for the sub-pattern $(1,1,-1,-1)$ formed by servo mark bits (3,4,5,6). Filter 661 output is $-4$ for the sub-pattern $(-1,-1,1,1)$ formed by servo mark bits (5,6,7,8). Filter 662 output is $+4$ for the sub-pattern $(1,1,0,0,-1,-1)$ formed by servo mark bits (7,8,9,10,11,12). Filter 662 output is $-4$ for the sub-pattern $(-1,-1,0,0,1,1)$ formed by servo mark bits (11,12,13,14,15,16).

Filter 661 transfers its output to the A inputs of an A>B comparator and an A<B comparator. The A>B comparator receives a positive threshold (+THR1) at the B input, and the A<B comparator receives a negative threshold (−THR1) at the B input, where THR1 is set from (0.5) to (3) depending on the gain set point. The comparators produce a one bit when their associated condition is met. The A>B comparator, with B=+THR1=+2.0, produces a one bit when A=+4, which occurs when filter 661 processes the sub-pattern $(1,1,-1,-1)$ formed by servo mark bits (3,4,5,6). The A<B comparator, with B=−THR1=−3, produces a one bit when A=−4, which occurs when filter 661 processes the sub-pattern $(-1,-1,1,1)$ formed by servo mark bits (5,6,7,8).

Filter 662 transfers its output to the A inputs of two other similar comparators. For filter 662, the A>B comparator produces a one bit when A=+4, which occurs when filter 662 processes the sub-pattern $(1,1,0,0,-1,-1)$ formed by servo mark bits (7,8,9,10,11,12). The A<B comparator produces a one bit when A=−4, which occurs when filter 662 processes the sub-pattern $(-1,-1,0,0,1,1)$ formed by servo mark bits (11, 12,13,14,15,16).

Each comparator has its own associated OR gate, and each comparator transfers its output to its associated OR gate. The comparator outputs are also delayed by one bit time and transferred to the associated OR gates, and delayed by two bit times and transferred to the associated OR gates. Thus, the OR gates produce a one bit for three consecutive bit times after its associated comparator indicates a sub-pattern match. The output of each of the four OR gates is passed through a decimator that eliminates every other bit to remove unnecessary or redundant information and respectively produce signals 651–654. Advantageously, the delays and OR gates allows detector 541 to handle the phase shifts caused by mis-aligned servo marks.

FIG. 7 illustrates sub-pattern correlation 542 receiving signals 651–654 from sub-pattern detection 641. Signal 651 is delayed by 4 bit times and inverted. That inverts the signal. Signal 652 is delayed by 5 bit times and inverted. Signal 653 is delayed by 6 bit times and inverted, and signal

| Bit  | 1 | 2 | 3 | 4 | 5  | 6  | 7 | 8 | 9 | 10 | 11 | 12 | 13 | 14 | 15 | 16 |
|------|---|---|---|---|----|----|---|---|---|----|----|----|----|----|----|----|
| Mark | 0 | 0 | 1 | 1 | −1 | −1 | 1 | 1 | 0 | 0  | −1 | −1 | 0  | 0  | 1  | 1  |

FIG. 6 illustrates sub-pattern detection 541 for servo mark detector 540. Starting at the left, a multiplier receives interpolated samples 434 and a sign bit. The sign bit is controlled to match the polarity of the samples with the polarity of detection 541. The multiplier transfers the polarity-adjusted signal to matched filters 661 and 662. Matched filters 661–662 produce outputs as follows for a sequence of six samples (B0,B1,B2,B3,B4,B5):

Filter 661 output=1+D−D^2−D^3=B0+B1−B2−B3

Filter 662 output=1+D−D^4−D^5=B0+B1−B4−B5

653 is also inverted without delay. Signal 654 is delayed by 2 bit times and inverted. The inverted signals are transferred to an adder that sums the signals.

The delays synchronize the detection times of the various sub-patterns. The detection of multiple sub-patterns and corresponding delays result in ones being fed to the inverters and zeros being fed to the adder. Thus, the detection of multiple sub-patterns lowers the sum out of the adder.

The adder sums are passed through a decimator to remove unnecessary or redundant information. The decimated sums are transferred to the A input of an A≦B comparator. A second threshold (THR2) set from 0–5 is provided to the B input. If the decimated sum is less than or equal to THR2, then the comparator produces a one to indicate servo mark detection. If THR2=2 and the decimated sum=0, 1, or 2, then servo mark detection is indicated. The servo mark detection signal 546 indicates the servo mark detection to servo control 543.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A disk drive system comprising:
    a disk device configured to read storage media to generate a read signal representing data and transfer the read signal to control circuitry; and
    control circuitry configured to receive the read signal, process the read signal to detect servo mark sub-patterns that each comprise a plurality of bits that form a portion of a servo mark, and correlate the detected servo mark sub-patterns to detect the servo mark.

2. The disk drive system of claim 1 wherein the control circuitry includes matched filters configured to detect different ones of the servo mark sub-patterns.

3. The disk drive system of claim 2 wherein the control circuitry is configured to synchronize indications of the detected servo mark sub-patterns.

4. The disk drive system of claim 3 wherein the control circuitry is configured to compare the synchronized indications of the detected servo mark sub-patterns to a threshold.

5. The disk drive system of claim 1 wherein the control circuitry is configured to generate and transfer a position signal to the disk device in response to the servo mark detection.

6. The disk drive system of claim 5 wherein the disk device is configured to position the storage media in response to the position signal.

7. The disk drive system in claim 1 wherein the control circuitry is further configured to sample the read signal to generate read samples.

8. The disk drive system in claim 7 wherein the control circuitry is further configured to adaptively filter the read samples to generate equalized samples.

9. The disk drive system in claim 8 wherein the control circuitry is further configured to interpolate the equalized samples to generate interpolated samples.

10. The disk drive system in claim 9 wherein the control circuitry is further configured to detect an encoded signal from the interpolated samples.

11. The disk drive system in claim 10 wherein the control circuitry is further configured to decode the encoded signal.

12. Disk drive control circuitry comprising:
    servo mark sub-pattern detection circuitry configured to detect servo mark sub-patterns that each comprise a plurality of bits that form a portion of a servo mark; and
    servo mark sub-pattern correlation circuitry configured to correlate the detected servo mark sub-patterns to detect the servo mark.

13. The disk drive control circuitry of claim 12 wherein the servo mark sub-pattern detection circuitry includes matched filters configured to detect different ones of the servo mark sub-patterns.

14. The disk drive control circuitry of claim 13 wherein the servo mark sub-pattern correlation circuitry is configured to synchronize indications of the detected servo mark sub-patterns.

15. The disk drive control circuitry of claim 14 wherein the servo mark sub-pattern correlation circuitry is configured to compare the synchronized indications of the detected servo mark sub-patterns to a threshold.

16. The disk drive control circuitry of claim 12 further comprising servo control circuitry configured to generate and transfer a position signal in response to the servo mark detection.

17. The disk drive control circuitry of claim 12 further comprising a read channel configured to sample a read signal to generate read samples.

18. The disk drive control circuitry of claim 17 wherein the read channel is configured to adaptively filter the read samples to generate equalized samples.

19. The disk drive control circuitry of claim 18 wherein the read channel is configured to interpolate the equalized samples to generate interpolated samples.

20. The disk drive control circuitry of claim 19 wherein the read channel is configured to detect an encoded signal from the interpolated samples.

21. The disk drive control circuitry of claim 20 wherein the read channel is configured to decode the encoded signal.

22. A read channel comprising:
    a sampler configured to receive and sample a read signal to generate read samples;
    an adaptive filter configured to receive and shape the read samples to generate equalized samples;
    an interpolator configured to receive and interpolate the equalized samples to generate interpolated samples;
    a detector configured to receive the interpolated samples, detect an encoded signal from the interpolated samples, detect servo mark sub-patterns from the interpolated samples therein the servo mark sub-patterns each comprise a plurality of bits that form a portion of a servo mark, correlate the detected servo mark sub-patterns to detect the servo mark; and
    a decoder configured to receive and decode the encoded signal.

23. The read channel of claim 22 wherein the detector includes matched filters configured to detect different ones of the servo mark sub-patterns.

24. The read channel of claim 23 wherein the detector is configured to synchronize indications of the detected servo mark sub-patterns.

25. The read channel of claim 22 wherein the detector is configured to compare the synchronized indications of the detected servo mark sub-patterns to a threshold.

26. A method of operating a disk drive system, the method comprising:
    reading storage media to generate a read signal representing data;
    processing the read signal to detect servo mark sub-patterns that each comprise a plurality of bits that form a portion of a servo mark; and
    correlating the detected servo mark sub-patterns to detect the servo mark.

27. The method of claim 26 wherein processing the read signal comprises using matched filters to detect different ones of the servo mark sub-patterns.

28. The method of claim 27 wherein correlating the detected servo mark sub-patterns comprises synchronizing indications of the detected servo mark sub-patterns.

29. The method of claim 28 wherein correlating the detected servo mark sub-patterns comprises comparing the synchronized indications of the detected servo mark sub-patterns to a threshold.

30. The method of claim 26 further comprising generating a position signal in response to the servo mark detection.

31. The method of claim 30 further comprising positioning the storage media in response to the position signal.

32. The method of claim 26 further comprising sampling the read signal to generate read samples.

33. The method of claim 32 further comprising adaptively filtering the read samples to generate equalized samples.

34. The method of claim 33 further comprising interpolating the equalized samples to generate interpolated samples.

35. The method of claim 34 further comprising detecting an encoded signal from the interpolated samples.

36. The method of claim 35 further comprising decoding the encoded signal.

37. A method for operating disk drive control circuitry, the method comprising:

detecting servo mark sub-patterns that each comprise a plurality of bits that form a portion of a servo mark; and correlating the detected servo mark sub-patterns to detect the servo mark.

38. The method of claim 37 wherein detecting servo mark sub-patterns comprises using matched filters to detect different ones of the servo mark sub-patterns.

39. The method of claim 38 wherein correlating the detected servo mark sub-patterns comprises synchronizing indications of the detected servo mark sub-patterns.

40. The method of claim 39 wherein correlating the detected servo mark sub-patterns comprises comparing the synchronized indications of the detected servo mark sub-patterns to a threshold.

41. The method of claim 37 further comprising generating a position signal in response to the servo mark detection.

42. The method of claim 37 further comprising sampling a read signal to generate read samples.

43. The method of claim 42 further comprising adaptively filtering the read samples to generate equalized samples.

44. The method of claim 43 further comprising interpolating the equalized samples to generate interpolated samples.

45. The method of claim 44 further comprising detecting an encoded signal from the interpolated samples.

46. The method of claim 45 further comprising decoding the encoded signal.

47. A method of operating a read channel, the method comprising: sampling a read signal to generate read samples;

shaping the read samples to generate equalized samples;

interpolating the equalized samples to generate interpolated samples;

detecting servo mark sub-patterns from the interpolated samples wherein the servo mark sub-patterns each comprise a plurality of bits that form a portion of a servo mark;

correlating the detected servo mark sub-patterns to detect a servo mark;

detecting an encoded signal from the interpolated samples; and decoding the encoded signal.

48. The method of claim 47 wherein detecting servo mark sub-patterns comprises using matched filters to detect different ones of the servo mark sub-patterns.

49. The method of claim 48 wherein correlating the detected servo mark sub-patterns comprises synchronizing indications of the detected servo mark sub-patterns.

50. The method of claim 49 wherein correlating the detected servo mark sub-patterns comprises comparing the synchronized indications of the detected servo mark sub-patterns to a threshold.

* * * * *

UNITED STATES PATENT AND TRADEMARK OFFICE
CERTIFICATE OF CORRECTION

PATENT NO. : 6,680,807 B1
DATED : January 20, 2004
INVENTOR(S) : Sian She and David E. Reed It is certified that error appears in the above-identified patent and that said Letters Patent is hereby corrected as shown below:

Column 2,
Line 63, should read -- samples 135. Sampler 121 transfers read samples 135 to --

Column 5,
Line 60, should read -- interpolated samples 437 and a sign bit. The sign bit is --

Column 8,
Line 34, should read -- samples wherein the servo mark sub-patterns each com- --

Signed and Sealed this

Sixth Day of April, 2004

JON W. DUDAS
*Acting Director of the United States Patent and Trademark Office*